Aug. 11, 1970      L. J. BEINDORF      3,523,462
TRANSMISSION BELT
Filed June 26, 1968      2 Sheets-Sheet 1
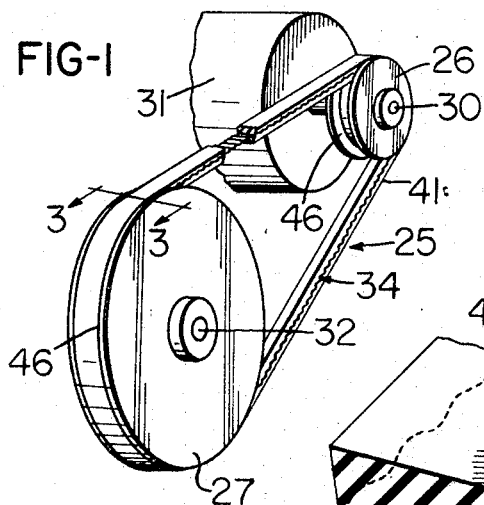
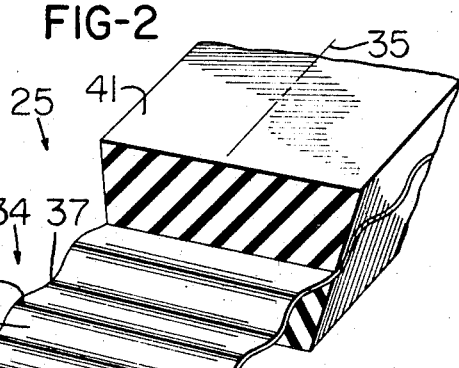
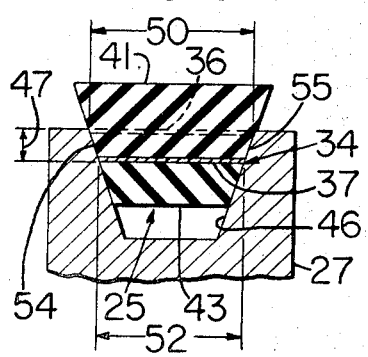
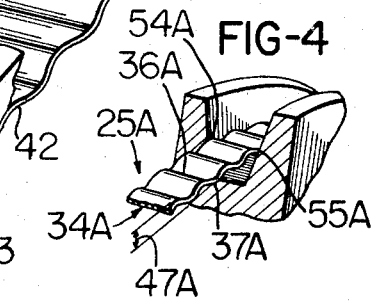
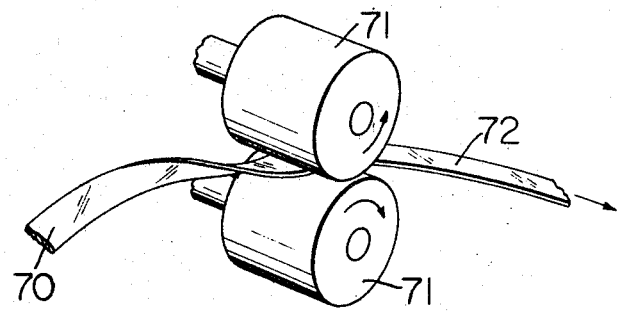
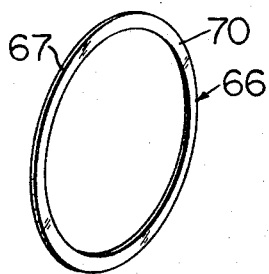
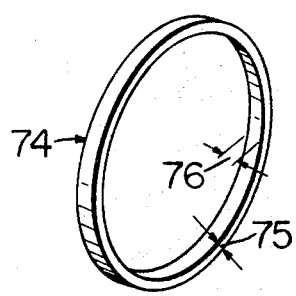
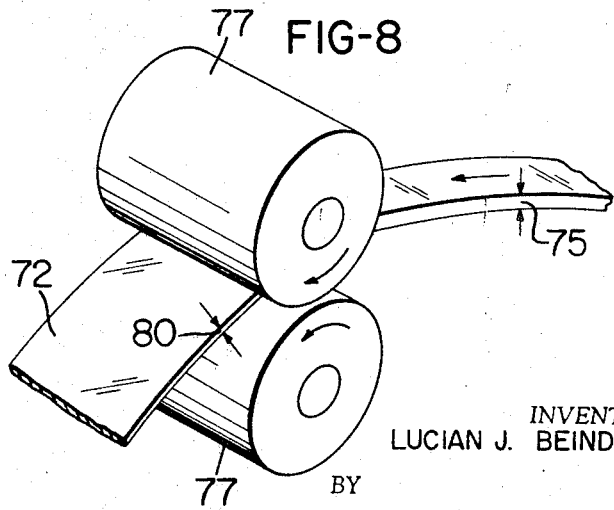
INVENTOR.
LUCIAN J. BEINDORF
BY Reuben Wolk
HIS ATTORNEY

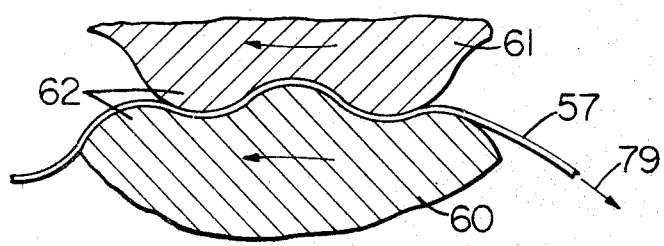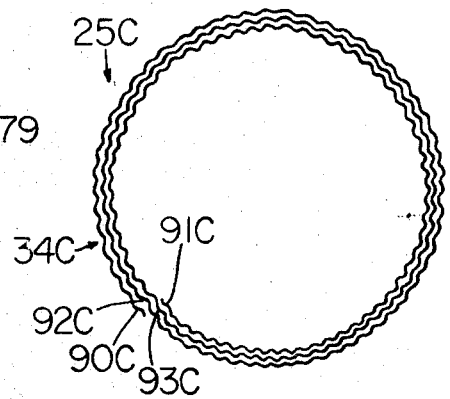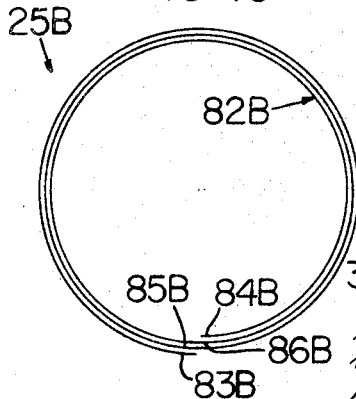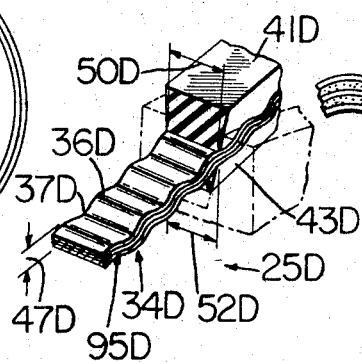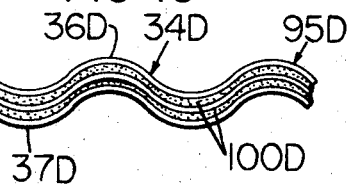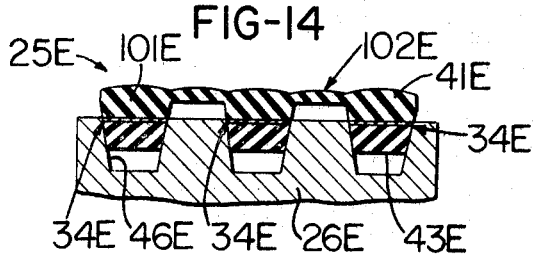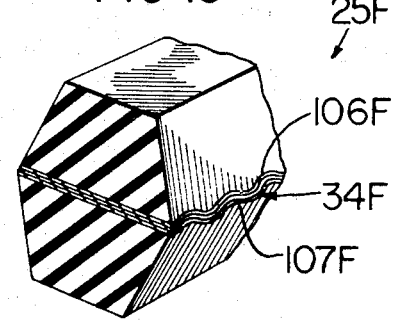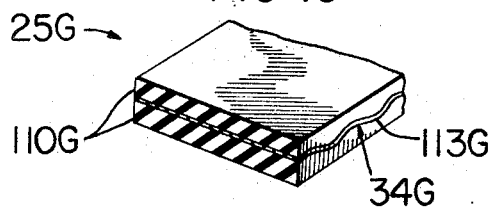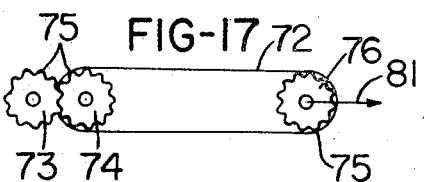

United States Patent Office 3,523,462
Patented Aug. 11, 1970

3,523,462
TRANSMISSION BELT
Lucian J. Beindorf, Springfield, Mo., assignor to Dayco
Corporation, Dayton, Ohio, a corporation of Delaware
Filed June 26, 1968, Ser. No. 740,356
Int. Cl. F16g 5/10, 5/16
U.S. Cl. 74—233          10 Claims

ABSTRACT OF THE DISCLOSURE

A transmission belt wherein such belt has a load-carrying section made of a metallic material and provided with a plurality of integral transverse undulations along the full length of the load-carrying section.

BACKGROUND OF THE INVENTION

It has been previously proposed to provide power transmission belts commonly referred to as V-belts made of metal. However, previously proposed metal V-belts are generally unsatisfactory in that they have very short operating lives, must be precisely constructed and accurately matched with associated parts (which is impractical), and are generally unacceptable for use between sheaves which are even slightly misaligned.

SUMMARY

This invention provides an improved transmission belt wherein such belt has a load-carrying section made of metal and such belt is of simple and economical construction, has a long operating life, is easy to install and maintain, may be used with essentially standard sheaves, and is capable of providing long service even when operating between misaligned sheaves.

Other details, uses, and advantages of this invention will become apparent as the following description of the embodiments thereof presented in the accompanying drawings proceeds.

BRIEF DESCRIPTION OF THE DRAWINGS

The accompanying drawings show present preferred embodiments of this invention, in which:

FIG. 1 is a perspective view with parts in section and parts broken away particularly illustrating one exemplary embodiment of the transmission belt of this invention installed in position between a pair of associated sheaves;

FIG. 2 comprises a greatly enlarged fragmentary perspective view illustrating that portion of FIG. 1 which has a portion of the tension section and an oppositely arranged compression section broken away to particularly illustrate its metal load-carrying section and the integral undulations provided in such metal load-carrying sections;

FIG. 3 is a greatly enlarged cross-sectional view on the line 3—3 of FIG. 1;

FIG. 4 is a fragmentary perspective view illustrating another exemplary embodiment of the transmission belt of this invention which is comprised solely of an undulating load-carrying section made of metal and showing such metal belt arranged in position in a inwardly tapering groove of an associated sheave;

FIG. 5 is a perspective view of a flat annular metal disc which is used to form a substantially cylindrical continuous band means used to define a metallic load-carrying section of a transmission belt;

FIG. 6 is a fragmentary perspective view illustrating the manner of rolling the flat disc of FIG. 5 between a pair of forming rolls to define a substantially cylindrical band;

FIG. 7 illustrates a comparatively thick cylindrical metal piece which is used to define substantially cylindrical continuous band means used to define a metallic load-carrying section of an associated transmission belt;

FIG. 8 illustrates the manner of rolling the comparatively thick cylindrical piece of FIG. 7 between a pair of forming rolls to reduce the wall thickness thereof and form a thinner continuous cylindrical band means used to define a metallic load-carrying section of an associated transmission belt;

FIG. 9 is a view illustrating the manner of forming or shaping a plurality of substantially identical integral undulations in an elongated strip of metallic material which is used to define a load-carrying section of a transmission belt with the shaping action being achieved while holding the elongated strip under a predetermined tension;

FIG. 10 illustrates another power transmission belt of this invention made of a metallic material and defined by a single strip which is mound in a plurality of turns and with the terminal ends of the strip each being fastened to an immediately adjacent turn;

FIG. 11 illustrates another exemplary embodiment of a power transmission belt of this invention which is similar to the embodiment of FIG. 10 and has the further structural features of being provided with a plurality of integral undulations extending along the full length of the multiturn strip with each undulation extending transverse to and completely across the strip;

FIG. 12 is a fragmentary perspective view illustrating another exemplary embodiment of a power transmission belt of this invention which has a plurality of band means or layers comprising its load-carrying section and also has a tension section bonded to the undulating outside surface of the multilayered section and has a compression section bonded to the undulating inside surface of the load-carrying section;

FIG. 13 illustrates another exemplary embodiment of this invention wherein the power transmission belt of FIG. 11 may have bonding means for bonding immediately adjacent turns of its metallic load-carrying section;

FIG. 14 illustrates another exemplary embodiment of this invention comprised of a power transmission belt which has a plurality of three V-belt elements adapted to be received within a plurality of cooperating grooves in an associated sheave and with each V-belt element having a load-carrying portion made of a metallic material provided with undulations similar to the undulations provided in the load-carrying portion of the exemplary power transmission belt illustrated in FIG. 1;

FIG. 15 is a fragmentary perspective view particularly illustrating a double angle V-belt construction in which the load-carrying section is essentially of the construction illustrated in FIG. 13;

FIG. 16 is a fragmentary perspective view of another exemplary embodiment of a flat power transmission belt which has its load-carrying section made of a metallic material and provided with transverse undulations along the entire length thereof; and FIG. 17 is a schematic view particularly illustrating the manner of forming or shaping integral undulations in a continuous closed loop band while holding such band under a predetermined controlled tension.

DESCRIPTION OF ILLUSTRATED EMBODIMENTS

Reference is now made to FIG. 1 of the drawings, which illustrates one exemplary embodiment of an endless power transmission belt of this invention which is designated generally by the reference numeral 25 and shown installed in position around a driving sheave 26 and a driven sheave 27. The driving sheave 26 is suitably fastened to an associated shaft 30 which extends from a driving motor 31 which may be supplied with power from any suitable source. The driven sheave 27 is also fastened on an associated shaft 32 and the shaft 32 is suitably operatively connected to an associated load or machine which is to be driven.

As seen particularly in FIG. 2 of the drawings, the power transmission belt 25 is of a V-belt type and has essentially a trapezoidal cross-sectional configuration. The belt 25 has a load-carrying section made of a metallic material and designated generally by the reference numeral 34 and such load-carrying section has a plurality of substantially identical integral undulations provided along its entire length and each undulation extends transverse to the length of the load-carrying section 34 and in this example of the invention the integral undulations extend substantially perpendicular to the length or elongated axis 35 of the load-carrying section 34. The load-carrying section 34 of the transmission belt 25 is comprised substantially of a single layer strip or band means and the manner in which such band means or single layer strip is defined will be discussed in detail subsequently in this specification.

The load-carrying central portion 34 has a plurality of outwardly convex undulations 36 and an oppositely arranged plurality of inwardly convex undulations 37. The term outwardly convex as used in the context of this disclosure refers to the arrangement of the undulations 36 as they extend outwardly from the outer periphery of the belt 25 with such belt installed in position around its associated sheaves 26 and 27. Similarly, the reference to inwardly convex undulations 37 refers to the arrangement of the undulations 37 as they extend inwardly generally toward the center of the closed loop path defined by the belt 25 as it moves in its continuous path upon being driven by the driving sheave 26.

The exemplarly transmission belt 25 also has nonmetallic means 41 of substantially trapezoidal cross-sectional configuration bonded to the outside surface 40 of the undulating load-carrying section 34 which is commonly referred to as a tension section 41 for the belt 25. The transmission belt 25 also has nonmetallic means 43 also of substantially trapezoidal cross-sectional configuration bonded to the undulating inside surface 42 of the load-carrying section 34 which is commonly referred to as a compression section 43 for the belt 25.

The tension section 41 and compression section 43 may be made of suitable materials such as rubber compounds, or the like, which assure that the transmission belt 25 has the proper construction. In particular, the tension section 41 is generally made of a rubber-like material enabling it to easily bend around associated sheaves without strain or cracking. Similarly, the compression section 43 is made of a rubber-like material enabling it to compress readily as it moves around associated sheaves.

The load-carrying section 34 with its plurality of integral undulations 36 and 37 has optimum longitudinal elasticity. In addition, inasmuch as each undulation 36 and 37 extends substantially perpendicular to the longitudinal axis of the load-carrying section 34 and hence the transmission belt 25, the construction of the load-carrying section 34 provides maximum lateral rigidity as an integral part of the load-carrying section and without requiring separate parts, or the like.

In this example of the invention, each of the sheaves 26 and 27 has an inwardly tapered groove designated by the same reference numeral 46 which is provided circumferentially therearound and in a known conventional manner. The load-carrying section 34 with its integral undulations 36 and 37 provided therein has a constantly varying width along the full length thereof and in a manner that will now be described in detail in connection with FIGS. 2 and 3 of the drawings.

In particular, it will be seen that by providing the undulations 36 and 37 in the load-carrying section 34 an effective thickness designated by the reference numeral at 47 is defined for the load-carrying section 34 and such effective thickness is defined by the displacement, i.e., total displacement, of the undulations 36 and 37. Stated another way the displacement referred to is defined by the vertical height from the crest of an outwardly convex undulation 36 to the crest of an inwardly convex undulation 37.

As indicated above, the load-carrying section 34 has a constantly varying width and such width has a maximum dimension, indicated at 50, at the apex of each outwardly convex undulation 36 which corresponds to the increased width at an outer position along an associated tapered groove 46. The load-carrying section 34 has a minimum dimension, indicated at 52, at the apex of each inwardly convex undulation 37 which corresponds to the decreased width at an inner position along the associated tapered groove 46. With this construction, the effective thickness indicated at 47 provides a maximum area of contact by the load-carrying section 34 of the transmission belt 25 against an associated sheave to thereby increase the operating life of the load-carrying section 34 and hence the transmission belt 25 as well as the associated sheaves, such as sheaves 26 and 27 around which such power transmission belt 25 operates.

This greater area of contact is provided essentially along the lines indicated at 54 and 55 in FIG. 3 so that there is less loading per unit of sdie area of the load-carrying section 34 which minimizes stress concentrations is such load-carrying section. In effect, the unique belt 25 of this invention eliminates what might otherwise be essentially a single line contact which would tend to rapidly deteriorate a metal belt and an associated sheave within which such a belt would operate. In fact, one of the serious limitations of previously proposed single thickness metal V-belts is that there is effectively a line contact by the edges of each of such metal V-belts against an associated sheave which causes each previously proposed metal V-belt to deteriorate rapidly as well as damaging the associated sheaves in which each of such belts is used. To further highlight this point, reference is again made to the large area of contact at 54 and 55 provided by the unique load-carrying section 34 provided in the transmission belt 25 of this exemplary embodiment of the invention and it will be appreciated that with the effective thickness indicated at 47 the net effect is to provide a single thickness metal strip which has optimum load-carrying capacity. Further, the characteristics of such metal strip may be closely controlled to provide a longitudinal elasticity and lateral rigidity for the belt 25 which is not economically possible in ordinary V-belt constructions.

Although the exemplary transmission belt 25 illustrated in FIGS. 1–3 has a tension section 41 and a compression section 43 fixed in position on opposite sides of the undulating load-carrying section 34, the tension section 41 and compression section 43 may be eliminated if desired and all of the load of a transmission belt may be carried by a properly constructed load-carying section 34. This fact is highlighted by the exemplary embodiment of the power transmission belt illustrated in FIG. 4 which shows an all metal belt which will be designated generally by the reference numeral 25A and which has its load-carrying section which defines the entire belt designated by the general reference numeral 34A. The load-carrying section 34A and its component portions are substantially identical to the load-carrying section 34 of the belt 25; therefore, corresponding portions of the belt 25A, which is in effect defined solely by loading-carrying section 34A, will be designated by the same reference numeral as in the transmission belt 25 followed by the letter designation A and not described again in detail.

The undulations 36A and 37A comprising the load-carying section 34A of the all metal belt 25A define an effective thickness 47A and greater contact areas along the lines 54A ond 55A similar to the lines illustrated at 54 and 55 in FIG. 3 and this construction enables the all metal transmission belt 25A to operate in its associated sheaves for long periods of time, with minimum stresses imposed thereon, and without undue concern for misalignment of associated sheaves. Also, the undulations 36A and 37A provide unusual longitudinal elasticity of the type which can only be precisely controlled with an all metal belt construction as well as providing optimum lateral rigidity in the manner previously described.

The load-carying sections 34 and 34A are each defined by single layer band means which may be formed in any number of ways and several exemplary ways will now be described in detail. In particular, each load-carrying section 34 or 34A may be formed from an elongated flat strip of material designated by the reference numeral 57 in FIG. 9 and such elongated strip of material may be suitably passed through a pair of cooperating shaping or forming rolls or gears 60 and 61 each having cooperating forming teeth each designated by the same reference numeral 62 which provide the undulations in the elongated strip 57 in the desired manner. The diameters of the forming rolls 60 and 61 may be properly selected and the cooperating teeth 62 may also be provided with the desired configuration so that the undulations provided in the strip 57 may be closely controlled as to total displacement, frequency, and pitch circle so that upon arranging the formed strip in a closed loop path to define a load-carrying section 34 or 34A the resulting load-carrying section will operate in a satisfactory monner and with minimum stress concentrations, or the like. Also, it will be appreciated that the forming rolls 60 and 61 are selected so that the end usage of the formed strip is taken into account. In particular, consideration is given to the sizes of the sheaves about which a formed undulating load-carrying section is to be used.

The strip 57 may also be held under a controlled tension and as indicated by the arrow at 79 in FIG. 9 and any suitable apparatus and technique may be utilized to held the strip 57 under such controlled tension. It will be appreciated that by holding the unformed strip 57 under a controlled load or tension during forming, the desired elastic characteristics and transverse rigidity may be provided in the resulting formed undulating strip which is used to define a load-carrying section 34 or 34A.

The formed strip may then be suitably fastened in a closed loop path and in a fixed manner using any suitable known technique. For example, the terminal ends of the formed strip may be butt-welded or otherwise suitably fixed together so that the entire resulting closed-loop construction has a uniform thickness throughout its length. In addition, it will be appreciated that the terminal end portions of the single thickness strip may be overlapped and suitably fixed together by welding, cementing, riveting, or any other desired technique while keeping the transverse dimension at the point of junction at a minimum. However, irrespective of the technique utilized to join the terminal ends of an elongated single thickness strip together substantially the entire length of the load-carrying section thus defined has a single thickness throughout.

Reference is now made to FIGS. 5–8 and 17 which illustrate techniques and method steps wherein a substantially continuous annular body is suitably formed to define a closed loop band means such as define the load-carrying sections 34 and 34A. In particular it will be seen that FIG. 5 illustrates an annular flat disc 66 which has a limited thickness as indicated at 67 and a substantially planar main portion indicated at 70. The flat disc 66 is rolled between a pair of cooperating forming rolls 71 which effectively thins and inverts the planar main portion 70 so that it is arranged in a plane perpendicular to its original plane and in particular it is formed so that it has a substantially cylindrical configuration and a fragmentary portion of such cylindrical configuration is illustrated at 72 in FIG. 6.

The continuous annular body from which a load-carrying section 34 or 34A is made may be made from a tubular ring such as the ring 74 illustrated in FIG. 7. The ring 74 is comparatively thick as indicated at 75 and has a width as indicated at 76 and such ring is formed between a pair of cooperating forming rolls 77 so as to reduce the thickness thereof and define a closed loop cylindrical strip or band means which has a lesser thickness shown at 80 than the thickness 75 and such cylindrical band means is also designated by the reference numeral 72 in a similar manner as the cylindrical band 72 illustrated in FIG. 6.

The continuous band means is then formed so that it has a plurality of substantially identical integral undulations along the length thereof in any suitable manner and one technique for forming such integral undulations comprised of outwardly convex undulations 36 and inwardly convex undulations 37 for the load-carrying portion 34, for example, is illustrated in FIG. 17 of the drawings. In particular, it will be seen that the integral band 72 is formed between a cooperating pair of forming or shaping rolls or gears 73 and 74 each having cooperating forming teeth 75. The band 72 is formed in a continuous manner by the forming rolls 73 and 74 while passing the opposite end portions thereof around a takeup roll 76 which may also be provided with teeth substantially identical to the forming teeth provided in the forming rolls 73 and 74 and also designated by the reference numeral 75 for convenience.

Thus, it will be seen that the band 72 is shaped with integral undulations while it is in its closed loop form and the shaping may take place while applying a predetermined tension during the shaping thereof. One exemplary technique which may be utilized for achieving this holding of the band 72 at a predetermined tension is to relatively move the roll 76 away from the forming rolls 73 and 74 after fastening the band 72 in position therearound and by applying a force or tension as indicated by the arrow at 81 against the roll 76 to move such roll away from the shaping rolls 73 and 74 in the manner illustrated. Any suitable technique may be utilized for applying the tension indicated by the arrow at 81.

Another exemplary embodiment of a power transmission belt of this invention is illustrated in FIG. 10 of the drawings and such belt will be designated generally by the reference numeral 25B and it is made as an all-metal belt having, in effect, only a load-carrying section which will be designated generally by the reference numeral 82B. The load-carrying section 82B is defined by a single strip of metallic material wound in a plurality of turns with the terminal ends indicated at 83B and 84B being fastened to an adjoining turn as indicated at 85B and 86B for the terminal ends 83B and 84B respectively.

The load-carrying section 82B of the metal transmission belt 25B is particularly adapted to be used with sheaves such as the sheaves 26 and 27, for example, illustrated in FIG. 1 which are of standard configuration and size. Further, each turn of the load-carrying section 82B easily adapts to the radius of an associated sheave so that each turn carries a part of the total load carried by the load-carrying section 82B. It will also be appreciated that the multiturn load-carrying section 82B may have its side edges ground, or otherwise suitably formed, so as to correspond to the configuration of the side walls defining a tapered groove in an associated sheave.

In certain previously proposed metal V-belts comprised of a plurality of separate concentric flat bands if the sheave is slightly larger than designed for then the outer band would take practically the entire load and the inner bands generally buckle and fracture. Similarly, if the sheave used with such previous V-belts is slightly smaller than designed then the inner band would take practically the entire load and the outer bands would rattle and come off or if retained by a covering would buckle and fracture. By contrast the unique multiturn configuration provided by this invention as one continuous load-carrying band 82B is such that each turn tends to adapt to the radius of its associated sheave so as to carry a part of the total load.

Another exemplary embodiment of this invention is illustrated in FIG. 11 of the drawings and the belt illustrated in FIG. 11 is also comprised of a single elongated strip of metallic material which defines a load-carrying section which is similar to the single thickness load-carrying section 34 of the transmission belt 25 therefore the load-carrying section in the transmission belt 25C illustrated in FIG. 11 will be designated by the reference numeral 34C. The load-carrying section 34C has a plurality of undulations provided along its entire length and the undulations in each turn are received in nested relation within associated undulations of an immediately adjacent turn so as to define an undulating multilayer load-carrying section 34C.

The metal belt 25C illustrated in FIG. 11 is defined from a single elongated strip and has a pair of terminal ends 90C and 91C which are fastened to an immediately adjacent turn in a suitable manner and as indicated at 92C and 93C respectively. The ends 90C and 91C are fastened so that there is no overlap of the ends 90C and 91C which would provide an abrupt increase in thickness. However, it will be appreciated that such overlap may be provided if desired. The multiturn metal belt 25C, i.e., the load-carrying section 34C which is the entire belt, may be of constant width if used in a flat belt, for example, or if desired it may have a constantly varying width in a similar manner as described in connection with the all metal belt 25A shown in FIG. 4. The constantly varying width would be provided by merely grinding the opposed side edges of the multiturn belt 25C so as to provide a tapered configuration corresponding to the configuration of a tapered groove provided in an associated sheave.

Another exemplary embodiment of this invention is illustrated in FIG. 12 of the drawing wherein a transmission belt similar to the transmission belt 25 is illustrated; therefore, the transmission belt of FIG. 12 will be designated generally by the reference numeral 25D and components or portions thereof which are very similar to corresponding components of the transmission belt 25 will be designated by the same reference numeral as in the transmission belt 25 also followed by the letter designation D and not described again.

The main difference between the transmission belt 25D and the transmission belt 25 is that its load-carrying portion 34D is defined by a plurality of band means each designated generally by the reference numeral 95D and each band means 95D may be defined as a single closed-loop band or may be merely a turn of an elongated strip which is wound in a plurality of turns. In this example of the invention each band means of the exemplary belt 25D comprises a turn of the plurality of turns which define the load-carrying section 34D and the immediately adjacent turns are suitably bonded together in a manner as will be described in detail in connection with FIG. 13 of the drawings. The elongated strip defining the turns 95D has a plurality of undulations provided therein along its length and upon defining the plurality of turns 95D the undulations in each turn are received in nested relation within associated undulations of an immediately adjacent turn so as to define an undulating multilayer load-carrying section which will be referred to as load-carrying section 34D.

The multilayer load-carrying section 34D has a constantly varying width along the full lenth thereof, i.e., along the entire length of its closed loop path, and has an effective thickness which is defined by the total displacement of the multilayer section 34D and as indicated at 47D. The multilayer load-carrying section 34D has a maximum dimension 50D at the apex of each outwardly convex undulation 36D of the multilayer section which corresponds to the increased width at an outer position along an associated tapered groove provided in an associated sheave. The multilayer section 34D has a minimum dimension at the apex of each inwardly convex undulation 37D which corresponds to the decreased width indicated at 52D at an inner position along a tapered groove of an associated sheave. The effective thickness 47D provides a maximum area of contact by the load-carrying section 34D against an associated sheave to thereby increase the operating life of the section 34D and belt 25D as well as each sheave with which the particular belt 25D is used. As in the case of the transmission belt 25 the belt 25D has its tension section 41D and compression section 43D which may be formed of any suitable nonmetallic material such as a rubber compound, or the like.

As previously indicated in connection with the transmission belt 25D illustrated in FIG. 12 the band means 95D may be separate concentric bands or turns of a single strip and may be suitable fastened or bonded together, if desired, to define the load-carrying section 34D. The bonding means is indicated in FIG. 13 by the reference numeral 100D and is comprised of a resilient material which holds immediately adjacent turns 95D of an elongated strip together under load, i.e., during loading of belt 25D, while allowing such turns to move relative to each other as an integral unit and such resilient material resiliently restores such turns to their original positions upon removal of such load from the transmission belt formed with bonded turns in a manner illustrated in FIG. 13.

Any suitable resilient material may be utilized to build a multilayer load-carrying section and plastic materials such as Teflon, elastic cements, and the like may be utilized. In addition, it may be desired to provide adhesive means together with magnetic powders which may be utilized in association with a compression section of a transmission belt which is also magnetized to hold the immediately adjacent layers or turns together while allowing relative sliding movement therebetween thus enabling each turn of the multiturn belt construction to assume a portion of the load when using such multiturn belt construction in a sheave of improper size and to thereby avoid the problems previously indicated as being prevalent with existing multiple band metal V-belts.

The laminated construction for the load-carrying section 34D illustrated in FIG. 13 may be used in the belt construction 25D or for that matter it may be used in any belt construction such as a flat belt of the general type indicated in FIG. 16, a banded belt of the type illustrated in FIG. 14, or a double angle V-belt of the type illustrated in FIG. 15.

Another exemplary embodiment of this invention is illustrated in FIG. 14 of the drawings. The transmission belt of FIG. 14 has a similar load-carrying section as the belt 25; therefore, such belt will be designated generally by the reference numeral 25E for convenience and ease of presentation and parts thereof which are very similar to corresponding parts of the belt 25 will be designated by the same numeral as for the belt 25 also follower by the letter designation E and not described again. Only those component parts which are substantially different from corresponding parts of the belt 25 will be designated by a new numeral also followed by the letter designation E and described in detail.

The belt 25E has a plurality of V-belt elements 101E which when considered individually are very similar to the individual transmission belt 25 illustrated in FIG. 1. The elements 101E are suitably banded together in a known manner by a band indicated at 102E and the V-belt elements 101E are adapted to be received within cooperating tapered grooves 46E of an exemplary sheave 26E. The load-carrying section of the belt 25E is defined as having a plurality of load-carrying portions each designated by the reference numeral 34E and each portion 34E is substantially identical to the load-carrying section 34 of the belt 25. As will be appreciated from FIG. 14 each load-carrying portion 34E has a plurality of undulations provided along the length thereof and each undulation extends substantially perpendicular to and completely across its associated load-carrying portion. Further, it will be seen that each V-belt element 101E of the transmission belt 25E has an associated tension section 41E and a compression section 43E.

Even with the banded V-belt 25E illustrated in FIG. 14 it will be appreciated that the effective thickness of each load-carrying portion 34E is substantially similar to the effective thickness 47 described in detail for load-carrying section 34 of the transmission belt 25 whereby maximum contact is provided by each load-carrying portion 34E against an associated sheave. The banded V-belt 25E thus has a longer operating life while also providing a construction which provides maximum longitudinal elasticity as well as improved lateral rigidity for a banded belt.

Another exemplary embodiment of this invention is illustrated in FIG. 15 of the drawings. The belt of FIG. 15 is designated generally by the reference numeral 25F and is in the form of a double angle V-belt having rubber-like material of substantially trapezoidal cross-sectional configuration suitably bonded to surfaces 106F and 107F of a load-carrying central section 34F which may be of the construction illustrated and previously described in conection with FIG. 13. The multilayer load-carrying section 34F is similar in function to the load-carrying section 34D previously described in connection with a more common V-belt configuration and therefore will not be described in more detail at this point.

Another exemplary embodiment of this invention is illustrated in FIG. 16 wherein a single thickness undulating band is shown in a typical flat transmission belt which is designated generally by the reference numeral 25G and which has portions 110G fastened on opposite surfaces of the load-carrying portion 113G. The belt 25G is shown as having a single thickness load-carrying section 34G extending therealong; however, it will be appreciated that such load-carrying section may be comprised of a plurality of multiple thickness band means of the type illustrated in FIGS. 12 and 13 of the drawings. Similarly, the double angle V-belt of FIG. 15 could also have only a single thickness portion defining its load-carrying section 34F.

Any suitable metallic material may be utilized to define load-carrying sections of the various exemplary transmission belts illustrated and described in this specification. Further, the materials may also be suitably treated so as to govern characteristics in a precise maner to provide transmission belts which have optimum longitudinal elasticity which can be controled within precisely controlled limits and optimum lateral rigidity which can also be controlled by the particular wave form, frequency, and total displacement of the undulations.

The transmission belts of the type disclosed in this specification, such as the belts 25 and 25D, for example, may be drum built on a rigid drum which may be of standard construction. Further, the tapered side edges for the various belts, such as belts 25 and 25D may also be easily formed on a standard drum by grinding or other suitable cutting process without requiring special equipment. Once the construction is completed on a standard drum it is a simple matter to slightly stretch the particular transmission belt without damage thereto. This easy stretching capability is another advantage of the unique transmission belt of this invention and it will be appreciated that previously proposed V-belts require either a collapsible drum, injection molding, or similar techniques during fabrication which greatly increase production costs and hence the cost of the resulting previously proposed transmission belts.

In the belt construction 25 and 25D it will be appreciated that the tension section 41, 41D, and compression section 43 and 43D respectively may be provided to enhance the integrity of the belt construction. Further, such sections may be provided to enhance the apearance, reduce noise and vibration, and in general provide a smoother operation of the resulting belt. Further, either the tension section, compression section, or both could be suitably colored for identification purposes.

The undulating load-carrying sections described in this specification have been shown with only certain exemplary types of belts; however, it is to be understood that each load-carrying section presented herein could be used with practically any type of belt having any desired cross-sectional configuration.

In the transmission belt 25D illustrated in FIG. 12 any desired number of turns or layers may be provided to define the particular band means and this of course would depend upon the thickness of each individual layer. In addition it will be appreciated that layers made of metallic foil may also be utilized and wound essentially in the maner described in this specification.

The undulating load-carrying section whether it be of a single thickness or of a multiple thickness may also be formed by preundulating the particular section to standard increments of a standard total length. For odd or fractional length belts, as required for special applications, the load-carrying section could be readily stretched on a center distance machine to the desired length. This stretching could be done with ease in both the all-metal belt and in the belt construction which utilizes a tension sec-transmission belt of this invention and it will be appreciated and a compression section. It could also be done even after a particular completed belt having nonmetallic portions is finished. However, as to such a completed belt similar to belts 25 and 25D, stretching would have to be more accurately controlled so as not to break the adhesion between the metallic load-carrying section and adjoining elements made of nonmetallic materials. It will also be appreciated that the amount that a particular completed belt could be lengthened unharmed would depend upon the characteristics of the load-carrying section, such as the modulus of elasticity of the metal as well as the similar characteristics of the nonmetallic materials used in association therewith.

The belt 25, for example, with its undulating load-carrying section is of optimum simplicity, as will be apparent from the drawings and description presented above. It will also be appreciated that optimum lateral rigidity and stability is provided without resorting to separate members such as special fabrics, rods, pins, or the like. Further, the belt 25 has optimum longitudinal elasticity and its lateral rigidity is an integral feature provided by its unique undulations 36 and 37.

While present exemplary embodiments of this invention, and methods of practicing the same, have been illustrated and described, it will be recognized that this invention may be otherwise variously embodied and practiced within the scope of the following claims.

What is claimed is:

1. In combination: a sheave, and an endless power transmission belt adapted to be used in said sheave, said belt comprising a load-carrying section made of a metallic material, said load-carrying section comprising integral continuous band means having a controlled thickness throughout the length thereof and having a plurality of substantially identical integral undulations provided along the length thereof, with each undulation extending transverse to said length, and said undulations providing said load-carrying section with maximum longitudinal elasticity as well as maximum lateral rigidity, said integral continuous band means comprising a plurality of concentrically arranged band means, and further comprising means bonding immediately adjacent undulating surfaces of said band means together allowing said band means to move relative to each other under load while holding said band means firmly together as an integral unit, said bonding means resiliently restoring said band means to their original positions upon removal of said load.

2. In combination: a sheave having a plurality of grooves provided therein and an endless power transmission belt having a plurality of V-belt elements adapted to be received within said grooves and having a tie band fastening said V-belt elements together as an integral unit, said transmission belt having a load-carrying section defined by a plurality of cooperating spaced load-carrying portions each made of a metallic material and each provided in an associated V-belt element, each metallic load-carrying portion extending across the full width of its belt element and having integral undulations provided along the length thereof with each undulation extending transverse to said length, said undulations providing each load-carrying portion and the entire load-carrying section with maximum longitudinal elasticity and lateral rigidity.

3. In combination: a sheave, and an endless power transmission belt adapted to be used in said sheave, said belt comprising a load-carrying section made of a metallic material, said load-carrying section having a plurality of substantially identical integral undulations provided along the length thereof, with each undulation extending transverse to said length, and said undulations providing said load-carrying section with maximum longitudinal elasticity as well as maximum lateral rigidity, said sheave having an inwardly tapered groove provided circumferentially therearound and said load-carrying section having a constantly varying width along the full length thereof, an effective thickness which is defined by the displacement of said undulations, a maximum dimension at the apex of each outwardly convex undulation which corresponds to the increased width at an outer position along said tapered groove, and a minimum dimension at the apex of each inwardly convex undulation which corresponds to the decreased width at an inner position along said tapered groove, said effective thickness providing a maximum area of contact by said load-carrying section against said sheave to thereby increase the operating life of said load-carrying section and sheave.

4. A combination as set forth in claim 3 and further comprising a nonmetallic material bonded to at least one surface of said load-carrying section, said nonmetallic material serving to protect said belt during normal handling thereof and also serving to identify and enhance the appearance of said belt.

5. A combination as set forth in claim 3 in which said load-carrying section comprises a substantially single thickness integral band means and further comprising nonmetallic means bonded to the undulating outside surface of said band means and comprising a tension section for belt and nonmetallic means bonded to the undulating inside surface of said band means and comprising a compression section for said belt.

6. In combination: a sheave, and an endless power transmission belt adapted to be used in said sheave, said belt comprising a load-carrying section made of a metallic material, said load-carrying section having a plurality of substantially identical integral undulations provided along the length thereof, with each undulation extending transverse to said length, and said undulations providing said load-carrying section with maximum longitudinal elasticity as well as maximum lateral rigidity, said sheave having an inwardly tapered groove provided circumferentially therearound and said load-carrying section being defined by a single elongated strip of said metallic material having said undulations provided therein along the full length thereof and said strip being wound in a plurality of turns with the terminal ends of said strip each being fastened to an immediately adjacent turn, with the undulations in each turn being received in nested relation within associated undulations of an immediately adjacent turn so as to define an undulating multilayer load-carrying section, said multilayer section having a constantly varying width along the full length thereof, an effective thickness which is defined by the total displacement of said multilayer section, a maximum dimension at the apex of each outwardly convex undulation of said multilayer section which corresponds to the increased width at an outer position along said tapered groove, and a minimum dimension at the apex of each inwardly convex undulation of said multilayer section which corresponds to the decreased width at an inner position along said tapered groove, said effective thickness assuring a maximum area of contact by said multilayer load-carrying section against said sheave to thereby increase the operating life of said belt and sheave.

7. A combination as set forth in claim 6 and further comprising means bonding immediately adjacent turns of said elongated strip together, said bonding means allowing said turns to move relative to each other under load while holding said turns firmly together as an integral unit and resiliently restoring said turns to their original positions upon removal of said load.

8. A combination as set forth in claim 7 and further comprising nonmetallic means bonded to the undulating outside surface of said load-carrying section and comprising a tension section for said belt and nonmetallic means bonded to the undulating inside surface of said load-carrying section and comprising a compression section for said belt.

9. An endless power transmission belt comprising a load-carrying section made of a metallic material, said load-carrying section being defined by a single elongated strip of metallic material wound in a plurality of turns, with the terminal ends of said strip being fastened to an immediately adjacent turn, each turn of said load-carrying section adapting to the radius of an associated sheave to carry a part of the total load, said single elongated strip of metallic material having a plurality of substantially identical integral undulations provided therein along the full length thereof, with each undulation extending transverse to said length and said undulations providing maximum longitudinal elasticity as well as maximum lateral rigidity for said load-carrying section, and further comprising means bonding immediately adjacent turns of said elongated strip together, said bonding means allowing said turns to move relative to each other under load, while holding said turns firmly together as an integral unit and resiliently restoring said turns to their original positions upon removal of said load.

10. A belt as set forth in claim 9 and further comprising nonmetallic means bonded to the undulating inside surface of said load-carrying section and nonmetallic means bonded to the undulating outside surface of said load-carrying section.

References Cited

UNITED STATES PATENTS

| 376,975 | 1/1888 | Adie. | |
|---|---|---|---|
| 1,729,329 | 9/1929 | Chilton. | |
| 2,562,166 | 7/1951 | Bendall | 74—233 |
| 3,404,577 | 10/1968 | Zahn | 74—229 |

FOREIGN PATENTS

| 574,189 | 12/1945 | Great Britain. |
| 788,147 | 12/1957 | Great Britain. |

JAMES A. WONG, Primary Examiner

U.S. Cl. X.R.

74—237

PO-1050
(5/69)

UNITED STATES PATENT OFFICE
CERTIFICATE OF CORRECTION

Patent No. 3,523,462            Dated August 11, 1970

Inventor(s) Lucian J. Beindorf

It is certified that error appears in the above-identified patent and that said Letters Patent are hereby corrected as shown below:

Column 2, line 19, "mound" should be --- wound ---

Column 10, line 30, the entire line should be deleted

Signed and sealed this 22nd day of June 1971.

(SEAL)
Attest:

EDWARD M. FLETCHER, JR.            WILLIAM E. SCHUYLER, JR.
Attesting Officer                   Commissioner of Patents